United States Patent [19]
Ernst

[11] 3,810,001
[45] May 7, 1974

[54] NUCLEAR MAGNETIC RESONANCE SPECTROSCOPY EMPLOYING DIFFERENCE FREQUENCY MEASUREMENTS

[75] Inventor: Richard Robert Ernst, Winterthur, Switzerland

[73] Assignee: Varian Associates, Palo Alto, Calif.

[22] Filed: June 15, 1972

[21] Appl. No.: 263,016

[52] U.S. Cl. .............................. 324/.5 R, 324/.5 A
[51] Int. Cl. ...................... G01r 33/08, G01n 27/02
[58] Field of Search ............... 324/.5 R, .5 A, .5 AC

[56] References Cited
UNITED STATES PATENTS
3,287,629 11/1966 Varian .............................. 324/.5 A
3,475,680 10/1969 Anderson et al. ................. 324/.5 A

*Primary Examiner*—Robert J. Corcoran
*Attorney, Agent, or Firm*—S. Z. Cole; G. M. Fisher

[57] ABSTRACT

A modified impulse type Fourier transform type of nuclear magnetic resonance spectrometer wherein the direct measurement of difference frequencies between a single reference resonance line and the multiple resonance lines of the sample under analysis is provided, which provides weighting of the sample decay response by its local signal-to-noise ratio resulting in simplified system components and avoidance of stringent conditions with respect to the stability of the static unidirectional magnet field. A non-linear detector forms the desired difference frequencies and weighting function. A first embodiment employs analog-to-digital conversion and a signal averaging computer with the resultant difference frequencies of the sample response Fourier-transformed to obtain the desired spectrum. A second embodiment avoids the analog-to-digital converter and the computer, utilizing instead a form of analog Fourier analyzer to obtain the output spectrum.

8 Claims, 11 Drawing Figures

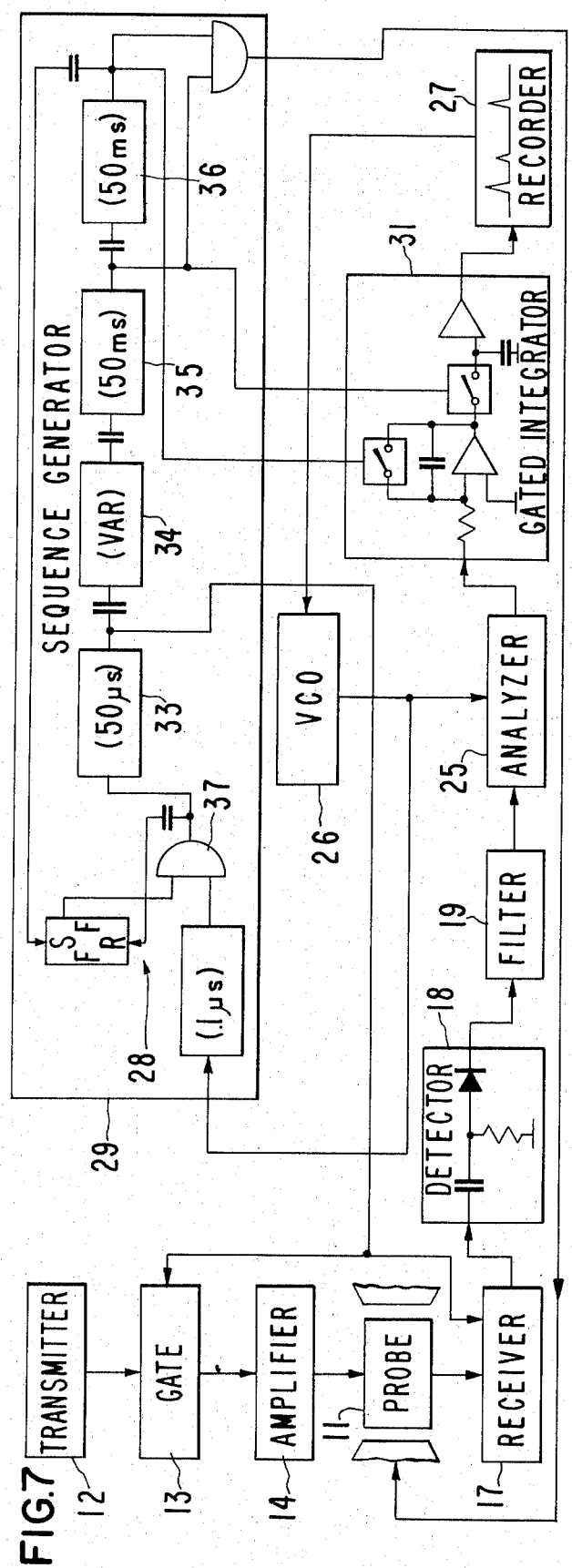
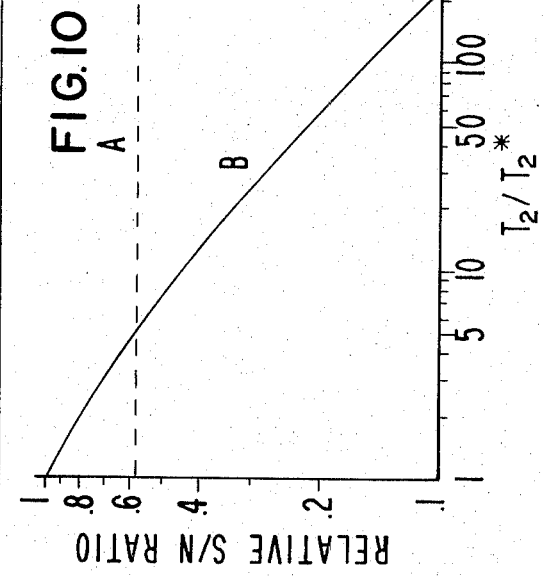
FIG.10
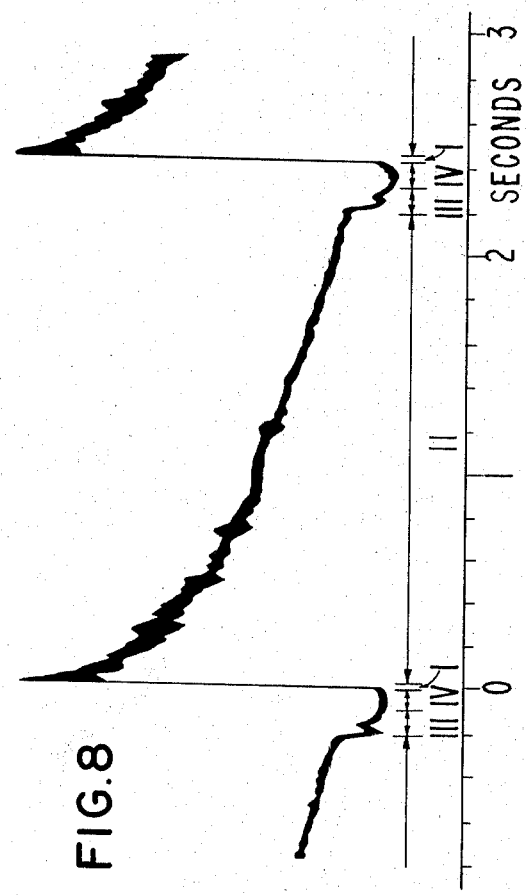
FIG.7
FIG.8

//3,810,001

NUCLEAR MAGNETIC RESONANCE SPECTROSCOPY EMPLOYING DIFFERENCE FREQUENCY MEASUREMENTS

BACKGROUND OF THE INVENTION

In present day nuclear magnetic resonance spectroscopy, spectra typically exhibit a large number of well-resolved resonance lines within a very narrow frequency range. The absolute measurement of the various resonance frequencies requires extremely high accuracy in frequency and magnetic field measurements. Therefore, most measurements are limited to the determination of frequency differences relative to a suitable reference line rather than an absolute measurement.

In one known method, which is very tedious, sidebands of a reference line are generated by modulation of one of the RF or magnetic fields to establish a number of reference or calibration marks in the sectrum. The line positions are then measured by interpolation and can be determined as accurately as the modulation frequencies are known.

Another technique utilizes field-frequency lock wherein the magnetic field is stabilized such that the resonance frequency of a reference line remains equal to the frequency $f_1$ derived from a radio frequency oscillator. A second radio frequency oscillator of variable frequency $f_2$ is used to detect the sample resonances. The frequency measurement is reduced to the determination of the difference frequencies $f_1 - f_2$ at the position of each resonance line. This latter method is described, for example, in an article by R. Freeman and D. Whiffen, Proceedings of the Physical Society London, Vol. 79, page 792, 1962, entitled The Effect of a Second Radiofrequency Field on High Resolution Proton Magnetic Resonance Spectra. This field-frequency lock technique is rather complex and expensive.

BRIEF SUMMARY OF THE INVENTION

The present invention provides a novel method and apparatus for directly providing an output spectrum of the sample under analysis in a pulse type nuclear magnetic resonance spectrometer which spectrum comprises the difference frequencies between the separate resonance lines in the sample and a single strong resonance line from a reference substance. These directly obtained difference frequencies are, to a very good approximation, independent of variations in the polarizing magnetic field, such that no stabilization of the magnetic field is required, leading to a considerable simplification of the spectrometer equipment. Additionally, the same enhancement of sensitivity is achieved as in conventional Fourier spectroscopy.

In this novel nuclear magnetic resonance spectrometer system, the sample to be analyzed and a reference substance preferably having a single strong resonance line are positioned in the polarizing magnetic field and a plurality of pulses of driving ratio frequency magnetic field are applied thereto to produce simultaneous magnetic resonance from the sample and reference at their respectively radio frequency resonance frequencies and thus produce a plurality of successive composite decay signals. These successive composite decay signals are detected in a receiver circuit coupled to the sample and reference and are then demodulated in an envelope detector where difference frequencies between all the resonances are generated. The dominant difference frequencies between the single reference line and the plurality of sample resonance lines are extracted by a low pass filter. In one embodiment of the invention, the resultant composite signal is sampled by an analog-to-digital converter, the successive decay signals are signal averaged, the reference response eliminated, and the remaining signal is Fourier transformed to obtain a sample resonance spectrum for recording whose zero frequency corresponds to the position of the reference line. In another embodiment, the resultant composite signal is operated on by a phase-sensitive analog Fourier analyzer in point-by-point manner to obtain a difference frequency spectrum. The output of the analyzer is averaged over one period and the steady-state output spectrum signal recorded.

BRIEF DESCRIPTION OF THE DRAWINGS

FIG. 7 is a block diagram of a second embodiment of the present invention wherein the analog-to-digital converter and computer of FIG. 1 have been replaced by simpler devices.

FIG. 8 is a section of a 60 MHz proton resonance response presented to the analog Fourier analyzer of FIG. 7.

FIG. 10 is a trace showing the dependence of the signal-to-noise ratio on the inhomogeneous line broadening for the difference frequency spectrometer of FIG. 7 as compared with a continuous wave spectrometer output.

DESCRIPTION OF THE PREFERRED EMBODIMENTS

Figure 1:
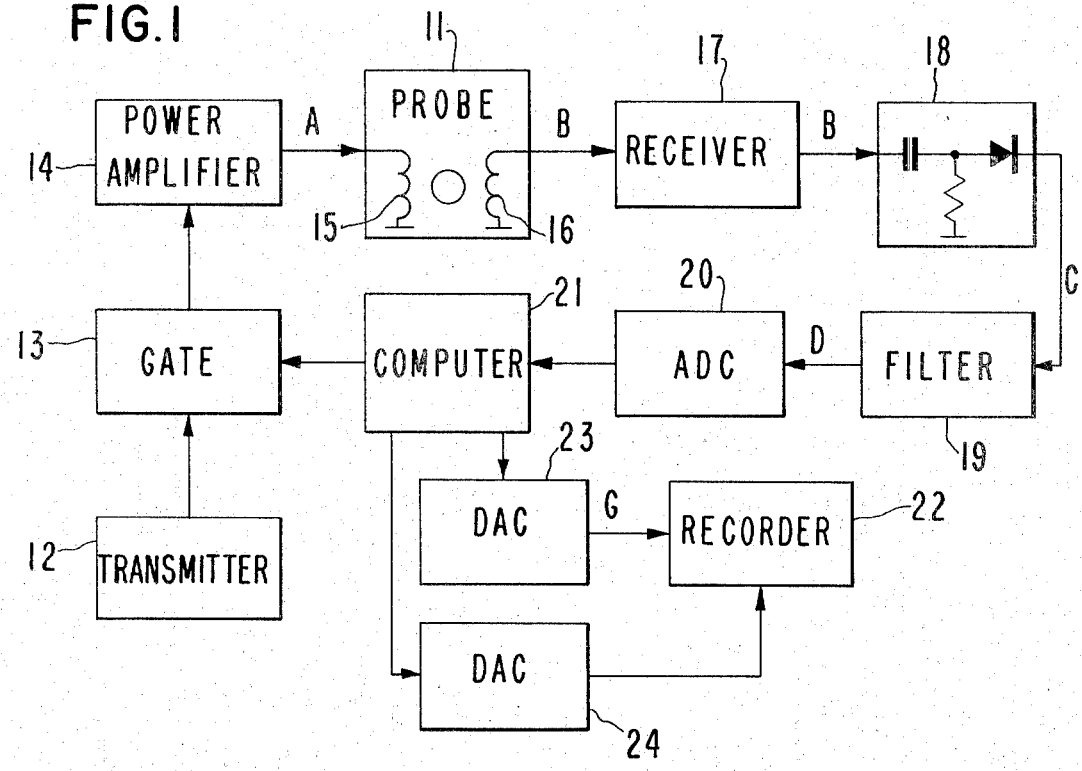
FIG. 1 is a block diagram of one embodiment of the difference frequency spectrometer of the present invention.

Referring to FIG. 1 a preferred embodiment of the invention comprises electromagnet means (not shown) for producing a strong unidirectional magnetic field typical in present day high resolution NMR spectrometer systems. The magnet system employed may be, for example, that utilized with the Varian Associates Model DA-60 high resolution NMR spectometer including the power supply with current stabilizer and the automatic homogeneity control apparatus operating to automatically control the homogeniety of the unidirectional magnetic field $H_o$ in a manner similar to that described in U.S. Pat. No. 3,443,209 issued on May 6, 1969 to F. Nelson et al entitled Magnetic Field Homogeneity Control Apparatus.

The proton sample to be investigated is positioned along with a reference substance in a known form of spinning sample probe 11 within the magnetic field and resonance is excited in the sample and reference by a pulse technique equivalent to Fourier transform spectroscopy of the type described in an article entitled Application of Fourier Transform Spectroscopy to Magnetic Resonance by R. Ernst and W. Anderson, Review of Scientific Instruments, Vol. 37, page 93, 1966, and in U.S. Pat. No. 3,475,680 issued Oct. 28, 1969, to W. Anderson and R. Ernst entitled "Impulse Resonance Spectrometer Including a Time Averaging Computer and Fourier Analyzer".

Figure 2:
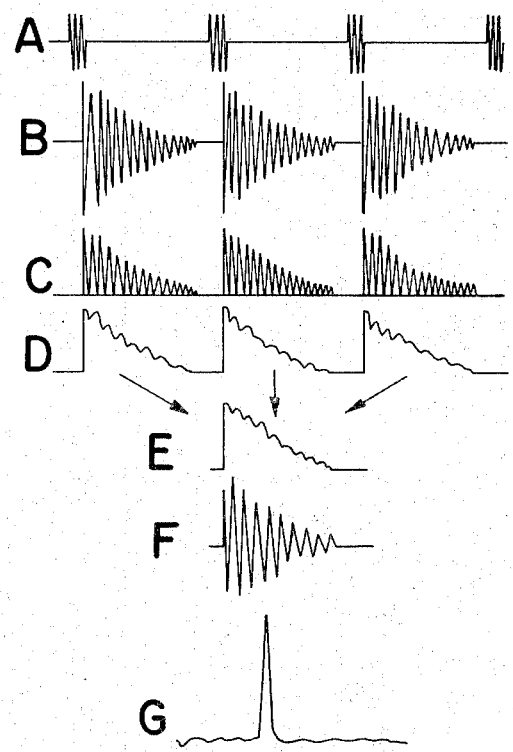
FIG. 2 is a schematic representation of the wave forms obtained at different stages of the operation of the Fourier difference frequency spectrometer system shown in FIG. 1.

The RF output of a transmitter 12, for example 60 MHz, is gated in a computer-controlled diode gate 13 of conventional design to generate the desired sequency of radio frequency pulses for the excitation of the spin system in the sample and reference. The pulses are amplified in a suitable power amplifier 14, for example a 4.5 watt amplifier, producing 90° pulses approximately 50 µs in length, and applied to the sample and reference via a transmitter coil 15 in the probe 11. These pulses are shown at A in the schematic representation in FIG. 2 of the various signals in the Fourier difference spectroscopy system of the present invention, these signal points A through G being labeled on the block diagram of FIG. 1.

The free-induction decay signal B of the sample and reference is sensed by the receiver coil 16, amplified in amplifier 17, and fed through a conventional diode detector 18 using a thermoionic diode of the type CK5704 (Raytheon) or a germanium diode of the type OA85 with equivalent results. The signal output C from detector 18 is filtered by a low pass filter 19 with a 3 dB frequency of 500 Hz (signal output D), is converted to its 1,024 point digital representation by means of a 9 bit + sign analog-to-digital converter, such as a Varian Spectrosystem 100 manufactured and sold by Varian Associates of Palo Alto, Calif., and is added to the sum of the previous decays in a suitable small computer 21 such as the Varian 620i computer with 8k memory (signal E). The sum is stored in double precision in two 16-bit words. The response from the reference material is suppressed as described below by a 6th-order Legendre polynomial approximation, employing floating point arithmetic (signal F). The data are reduced to single precision and are Fourier-transformed in well known manner with a fast Fourier transform routine (signal G). The pure absorption mode spectrum is obtained by means of a frequency-dependent phase and amplitude adjustment. The final spectrum is plotted on an XY recorder 22 using two 14 bit + sign digital-to-analog converters 23, 24 (Varian Spectrosystem 100). The magnetic field homogeneity is automatically adjusted as described below. Before applying the next radio frequency pulse, the remaining $x$ and $y$ components of the magnetization are destroyed by a strong pulse fed to the linear $y$-gradient correction coils.

The reference compound utilized should exhibit a single strong reference line located outside of the spectral range of interest. Since the reference line may easily be 100 to 1,000 times stronger than the sample lines, possible carbon-13 satellites of the reference line may appear as strong lines in the weak difference frequency spectrum and, therefore, carbon-13 nuclei coupled to the reference nucleus should be avoided. On the other hand, possible carbon-13 satellites may be utilized for calibration purposes.

Substances which are considered suitable reference compounds without satellites include the following:

for proton resonance, water and trifluoroacetic acid; the chemical shifts of these reference lines show a strong temperature dependence and careful temperature control is required;

for carbon-13 resonance, carbon disulfide and carbon tetrachloride;

and for phosphorus resonance, phosphoric acid, phosphorus trioxide, and white phosphorus in carbon disulfide.

Sidebands due to sample spinning can also appear in the Fourier difference spectrum and, therefore, such sidebands of the strong reference line should be avoided as well. This is best achieved by using a reference capillary in the center of the sample. It is only slightly affected by sample spinning and this arrangement has the additional advantage of producing a slowly decaying reference free induction signal due to higher field homogeneity which is important for proper operation of the envelope detector. It is preferable to use an additional internal reference to set a frequency mark of well known type independent of susceptibility effects.

Figure 3:
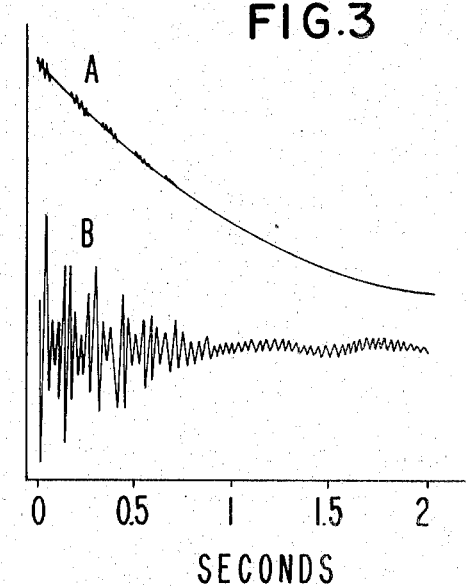
FIG. 3 shows at A a 60 MHz proton resonance free induction decay signal after envelope detection of a 0.2 volume percent solution of ethyl ether in carbon tetrachloride and using a reference capillary with a mixture $(H_2O):(D_2O) = 1:3$. Trace B shows the same free induction decay after elimination of the reference response by means of a polynomial approximation.

Referring to FIG. 3, there is shown at A a 60 MHz proton resonance free induction decay signal after envelope detection of a 0.2 percent solution of ethyl ether in carbon tetrachloride with a reference capillary comprising a mixture $(H_2O): (D_2O) = 1:3$. The sum of 128 free induction decays was taken by ensemble averaging within a total performance time of 256 seconds. The reference signal intensity was 20 times larger than the total sample signal intensity. The amplitude of the exciting RF pulses was optimized for maximum signal strength. FIG. 3 at B shows the same free induction decay after elimination of the reference response by means of a polynominal approximation.

Figure 4:
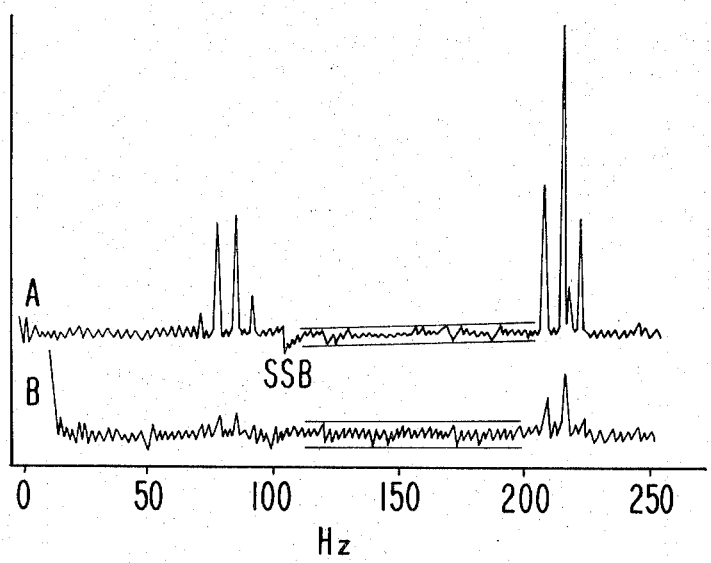
FIG. 4 at A shows a Fourier transform of the signal B of FIG. 3. Trace B shows a single scan of the same sample.

The Fourier transform of the signal B of FIG. 3 is shown in FIG. 4 at A. The weak signals near zero frequency are due to the incompletely suppressed reference signal, which is stronger by a factor of 67 than the center line of the triplet. A relatively strong spinning sideband (SSB) of the reference water line is apparent. For comparison, this figure also gives at B a spectrum recorded as a single scan in the same total time of 250 seconds using the same sample. This spectrum was obtained on the same instrument without returning the probe or preamplifier and using an internal lock on the water line. Thus, Fourier difference spectroscopy gives a sensitivity enhancement of a factor 9.5 which is close to the theoretical predictions.

The formation of the desired difference frequencies between the sample and reference lines requires a nonlinear detector element (18 of FIG. 1). Envelope detectors and quadratic detectors comprise two such suitable classes of detectors. An ideal envelope detector passes positive signals only and suppresses negative signals. The low frequency components of the detector output signal are proportional to the envelope of the original signal. Where the reference resonance frequency has a much higher amplitude than the sum of the amplitudes of the sample frequencies, the envelope apprximates the linear combination of the difference frequencies between sample resonance and reference resonance with relative amplitudes of each difference frequency determined by respective sample resonance amplitude. Practical realizations of envelope detectors are based on semiconductor diodes or thermoionic diodes and require sufficiently high input signals (several volts) to avoid the nonideal behaviour of these elements at low amplitudes.

The output of an ideal quadratic detector is equal to the square of the applied input signal and it includes bilinear cross-terms between all signal components. The cross-terms between sample and reference response can be made selectable by using a sufficiently strong reference signal. Quadratic detectors may be realized by applying sufficiently weak signals to diode detectors utilizing the quadratic characteristics at low amplitudes, or by means of an analog multiplier or a double balanced modulator in which the same signal is applied to both inputs. A quadratic detector inherently produces a matched filtering effect by multiplying sample response and reference response. It is equivalent to weighting the sample response with its local signal-to-noise ratio (assuming identical line shapes for sample and reference lines), and it automatically leads to the optimum signal-to-noise ratio for the Fourier-transformed spectrum, though, at the same time, resolution is reduced.

In the present system, envelope detectors are preferred since the dynamic range is larger and resolution is higher than for a quadratic detector.

Figure 5:
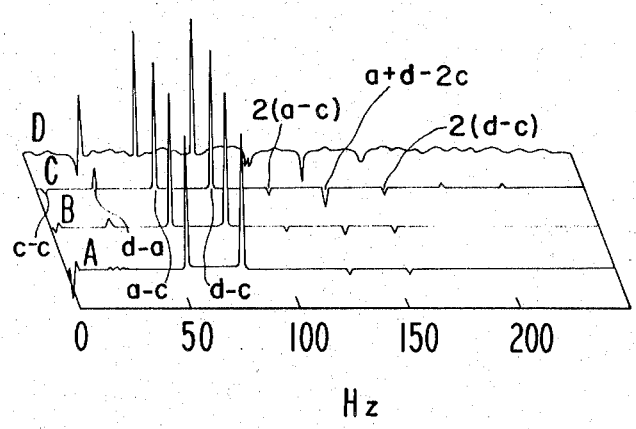
FIG. 5 shows Fourier difference spectra for different concentrations of acetone and dimethylsulfoxide in carbon tetrachloride with cyclohexane as an external reference in a capillary.

FIG. 5 demonstrates the influence of the ratio of sample to reference signal amplitudes on the amplitude of combination frequencies where the Fourier difference spectra is shown for different concentrations of acetone and dimethylsulfoxide in carbon tetrachloride with cyclohexane as the external reference in a capillary. The relative signal intensities are; A: (cyclohexane): (acetone): (dimethylsulfoxide) = 100:6:6; B: = 100:12:12; C: = 100:30: 30; and D: = 100:60:60. For the various combination frequencies, the generating frequency combinations are indicated: $c = f$ (cyclohexane), $a = f$ (acetone), and $d = f$ (dimethylsulfoxide). A linear detector with a germanium diode OA85 was used; peak signal voltages were 7 volts. The strongest unwanted component is the difference frequency between sample resonances. It is seen that, for satisfactory performance, the reference signal intensity is preferably a factor 10 larger than the total sample intensity.

In those cases where such a large intensity factor between reference and signal (i.e. a factor of 10) is not desired because of the possible loss of sensitivity of the signal response, the undesired higher combination lines shown, for example, on the right hand side of the spectrum of FIG. 5, may be eliminated from the output spectrum by utilizing well known deconvolution techniques in the computer 21 operating on the original spectrum with such higher combination lines to yield a final spectrum with the lines suitably reduced or eliminated. To avoid enhancement of the random noise by nonlinear effects in the detector, the reference response should be considerably larger than the random noise for the major part of the recorded decay, signal voltage/rms noise voltage ≥ 25. The two mentioned conditions determine the minimum usable reference signal amplitude.

Figure 6:
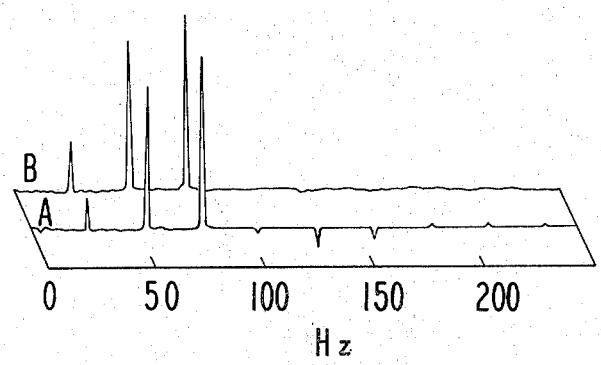
FIG. 6 shows a pair of Fourier difference spectra of the same substance of FIG. 5 and with various signal amplitudes applied to the diode detector.

FIG. 6 illustrates the effect of the signal amplitude at the diode detector on the appearance of combination frequencies, where the Fourier difference spectra of the same sample and reference of FIG. 5 is shown with the relative signal intensities of 100:30:30. Spectrum A was obtained with a peak signal voltage of 7 volts applied to the diode detector using a germanium diode OA85; spectrum B was obtained with an applied signal voltage of 0.7 volts. For large amplitudes, the detector acts as an envelope detector as shown by the appearance of higher combination frequencies (FIG. 6 at A). For small amplitudes, the behaviour of a quadratic detector is approximated, such that only difference frequencies and no harmonics can occur (FIG. 6 at B). The line broadening by the matched filtering effect is also apparent.

Since the response of the reference substance may be several orders of magnitude larger than the sample response, as required to minimize nonlinear effects in the detection process, it is of advantage to eliminate the reference response before the step of Fourier-transforming the free induction decay. This improves the accuracy and enhances the visual appearance of the transformed spectrum. Any one of several techniques may be utilized to eliminate the reference response including a high pass filter at the exit of the detector, a digital high pass filter, or a digital approximation process.

With a sharp cut-off high pass filter at the output of the detector, the low frequencies in the exponential reference decay are eliminated, the high pass filter passing the higher difference frequencies of the signal decay. There will remain a transient at the beginning of the free induction decay caused by the initial discontinuity of the reference signal (compare FIG. 2 at D); its shape is dependent on the characteristics of the filter. Additionally, phase shifts and amplitude variations are introduced into the sample response, which require critical adjustments of the final spectrum. The use of the high pass filter eliminates the need of a high resolution analog-to-digital converter, but it is applicable only for a reference line which is sufficiently separated from sample resonances.

An equivalent digital high pass filtering operation can be performed on the digitized data and, by means of suitable processes, it is possible to eliminate the above-mentioned transient as well as phase shifts. However, the requirement for a reference line widely separated from the sample resonances remains.

The most reliable procedure is the application of a digital approximation process to the composite response. The trial function for the approximation process is selected so that the reference response is well approximated, but it is too inflexible to approximate the higher frequencies of the sample response. The reference response is then eliminated by subtraction of the approximation point by point. An obvious choice for the trial function is an exponential function with the free parameters $a$, $b$ and $c$:

$$g(t) = a + b \exp(ct) \quad [1]$$

In most cases the reference response is sufficiently non-exponential to require the addition of higher order terms of the form $$g(t) = a + \sum_{k=1}^{n} b_k \exp(kct) \quad [2]$$

The coefficients $b_k$ are determined by means of an expansion in terms of orthogonal linear combinations of exponentials as described, for example, in J. H. Laning and R. H. Battin, "Random Processes in Automatic Control", page 381, McGraw-Hill Publishers, New York, (1956).

The most convenient approximation is found to be a Legendre polynomial approximation as described in F. G. Hildebrand, "Introduction to Numerical Analysis", page 272, McGraw-Hill Publishers, New York, (1956). A polynomial of 4th to 6th degree is appropriate in most cases. The reference response is suppressed by more than a factor 100. Typically, there remains a weak transient near zero frequency in the final Fourier-transformed spectrum (compare FIG. 4 and FIG. 5).

The dynamic range of the analog-to-digital converter should be large enough to allow an accurate recovery of the sample response which may be much weaker than the reference response. In most practical applications of Fourier difference spectroscopy, the sample response will be weaker than the random noise voltage, and the noise must be accurately digitized to allow the recovery of the buried signal by signal averaging. A signal completely buried in random noise can be recovered by means of a signal averaging procedure when the digitization quanta are smaller than the rms noise voltage; a factor 2 is usually sufficient. To digitize, at the same time, the considerably larger reference signal, a dynamical range of the analog-to-digital converter of $2v_{ref}/v_{rms}$ is required. In practical applications, this ratio may be 100 to 200. Thus, a 9–10 bit analog-to-digital converter is sufficient, in general, provided that the input voltage is adjusted such that its range is fully utilized.

The dynamical range of the computer memory must be larger than the range of the converter by the number of decays to be added in the signal averaging process. In most small computers, this requires a double precision representation of the averaged signal and increases the required memory space by a factor 2. This can be avoided by storing differences between successive analog-to-digital conversions only. These differences are considerably smaller than the full signal because the strong reference response changes slowly.

One other parameter to be adjusted in Fourier difference spectroscopy is that determining magnetic field homogeneity and for this purpose it is desirable to employ an automatic adjustment procedure of the type described in an article entitled Measurement and Control of Magnetic Field Homogeneity by R. R. Ernst, Review of Scientific Instruments, Vol. 39, page 998, (1968).

The integral of the detected composite response may be used as a sensitive measure for homogeneity since it is equivalent to the height of a signal peak in the Fourier-transformed spectrum. The initial amplitude of the free induction decay may vary from trace to trace due to constructive or destructive interference of successive decays, this interference depending on phase variations as caused by changes in precession frequency due to magnetic field variations. This interference is eliminated by completely destroying the $x$ and $y$ components of the magnetization immediately before applying the next radio frequency pulse and this is achieved by applying a strong pulse to one of the linear field gradient correction coils to randomize the precession phases in the manner set forth in an article entitled Measurement of Spin Relaxation in Complex Systems by R. Vold et al,, Journal of Chemical Physics, Vol. 48, page 3,831, (1968).

The control of a single parameter is often sufficient (e.g., the linear gradient along the sample spinning axis) and a fixed increment is added to or subtracted from the shim current according to whether the previous integral was smaller or larger than the present one.

Fourier difference spectroscopy is insensitive to magnetic field variations or modulations uniform over the sample volume so long as the amplitude of the modulation is small compared to the strength of the magnetic field Ho. The insensitivity to magnetic field modulation simplifies the design of the magnet power supply and suppression of line frequency ripple is not critical.

The insensitivity of magnetic field modulation may not be accomplished in two cases:

a. A narrow-band receiver may transform frequency modulation, caused by a time-dependent magnetic field strength, into amplitude modulation of the free induction decay through a frequency-dependent gain. Thus, the bandwidth of the receiver is selected wide enough to pass the signal without distortions.

b. Magnetic field modulation inhomogeneous over the sample volume will cause amplitude modulation and this is important in the case of sample spinning.

Fourier spectroscopy and conventional scanning NMR methods are equivalent with respect to spinning sidebands in the case of a cylindrical sample. Fourier difference spectroscopy is sensitive to spinning sidebands as well. Particularly, the spinning sidebands of the strong reference signal may be of considerable amplitude.

It is thus noted that Fourier difference spectroscopy allows precise and sensitive NMR measurements with comparatively simple and uncritical equipment. Particularly stringent requirements with respect to magnetic field stability are avoided. Fourier difference spectroscopy can be extended to more complex Fourier transform techniques; for example, it can be combined with refocussing methods of the type discussed in Becker et al., Journal of American Chemical Society, Vol. 91, page 7,784 (1969, J. S. Waugh, Journal of Molecular Spectroscopy, Vol. 35, page 298 (1970), and A. Allerhand et al., Journal of American Chemical Society, Vol. 92, page 4,482 (1970), which allow, under suitable conditions, further enhancement of sensitivity. It can also be applied to the measurement of relaxation times by means of Fourier spectroscopy.

As explained above, Fourier difference spectroscopy combines the high sensitivity of Fourier spectroscopy with almost complete insensitivity to magnetic field variations and leads to simple and inexpensive instrumentation except for the digital computer 21 of FIG. 1 which is required to Fourier-transform the free induction decays. There is shown in FIG. 7 another embodiment of the present invention, i.e., difference frequency spectroscopy, which possesses the same insensitivity to magnetic field variations but which avoids the requirement for a digital computer or a digital storage device. The computer 12 is replaced by a simple phase-sensitive analog Fourier analyzer and produces the same sensitivity as conventional continuous wave spectrometers. The analog Fourier analyzer may also be used in conventional Fourier spectroscopy for the Fourier analysis of free induction decays stored in a signal averaging device.

Except for data analysis and sensitivity, difference frequency spectroscopy is equivalent to Fourier difference spectroscopy. The spin system is excited with a repetitive sequence of strong radio frequency pulses applied to the sample and the reference in the probe 11 via the transmitter 12, gate 13, and amplifier 14. The response is amplified and restricted in bandwidth in receiver 17 and demodulated in an envelope detector 18. Envelope detection generates differences between all occurring frequencies. The dominant difference frequencies $\omega_i - \omega_o$, generated from the frequencies $\omega_i$ of the sample resonances and the frequency $\omega_o$ of a sufficiently strong reference line, are extracted by means of a low-pass filter 19. FIG. 8 shows a portion of the envelope-detected response of acrylonitrile and with acetone as a reference compound after low-pass filtering.

The difference frequency spectrum of the composite response is determined point by point by means of a phase-sensitive analog Fourier analyzer 25 described more fully below. Its reference frequency is provided by a voltage-controlled oscillator 26 (e.g. Wavetek Model 131) which is driven by a voltage proportional to the x-position of an xy-recorder 27 used to record the output signal of the analyzer. For phase-sensitive operation, it is necessary to maintain phase coherence between the input signal and the reference frequency to the analyzer 25. This is achieved by synchronizing the pulse sequence which excites the spin system to the reference frequency. A simple digital circuit 28 contained in the sequence generator 29 and controlled from the VCO is used for this purpose.

The output of the analyzer 25 is a periodic waveform produced by the periodic excitation of the spin system. To obtain a steady signal on the recorder 27 the analyzer output is averaged over one full period. This could be achieved by use of a low-pass filter but is best realized by means of a gated integrator 31 which integrates over one period, transfers the integral to a hold circuit and is reset before integrating the next period. The necessary switching operations are controlled from the sequence generator 29.

Magnetic field instabilities may cause constructive or destructive interference between successive free induction decays. To obtain a response amplitude independent of field instability, it is desirable to destroy the remaining transverse magnetization by means of a strong field gradient applied to the sample during a short time immediately before the next rf pulse under control of the sequence generator 29.

The timing of the required operations is effected by the sequence generator which includes a series of four one-shot circuits 33–36 which generate upon initiation a single pulse of the length indicated in brackets. The falling edge of each pulse triggers the following one-shot. The pulse length of the variable one-shot determines the accumulation time and thus the resolution. Each period of the analyses consists of the four phases as shown in FIG. 8 including an excitation phase I of 50 $\mu$s where the transmitter gate is open and the receiver gate closed; an accumulation phase II of 0.5 – 2 s where the transmitter gate is closed and the receiver gate open; a transfer phase III of 50 ms to transfer the integral to the hold circuit, and dehomogenize the field to destroy transverse magnetization; and a reset phase IV of 50 ms to reset the integrator and dehomogenize the field. At the end of phase IV, the input gate 37 to the sequence generator is enabled such that the next pulse from the voltage controlled oscillator 26 initiates the next sequence synchronized to the reference frequency of the analyzer.

The resolution of difference frequency spectroscopy is determined by the pulse spacing T in a completely analogous manner as in conventional Fourier spectroscopy. For a pulse spacing of T seconds, a minimum full width at half height of 0.6/T Hz will be obtained.

A simple phase-sensitive Fourier analyzer 25 which distinguishes absorption and dispersion modes is realized by a phase-sensitive detector (e.g. Brookdeal type 411). Its reference frequency $\omega_r$ is linearly swept through the range of possible input frequencies $0 < \omega_r < \omega_{max}$. Phase coherence is established as described above. The output signal is passed through a low-pass filter or a gated integrator 31 to the recorder 27.

An ideal phase-sensitive detector driven with the reference frequency $\omega_r$ also produces a dc output for input frequencies $\omega = (2n + 1) \omega_r$ for $n = 1,2,...$ with relative sensitivities of $1/(2n + 1)$. This may cause foldover of the high frequency part of the spectrum into the low frequency region as soon as the frequency spectrum to be analyzed covers more than two octaves such that no fixed filter can be selected to suppress the odd harmonics of all pertinent input frequencies. At the same time, some high frequency noise is downconverted increasing the rms noise voltage by a maximum of 11 percent for white noise.

There are several methods for correcting this disadvantage including a voltage controlled filter, an analog multiplier, and frequency shifting. In the first method the voltage used to drive the voltage-controlled reference frequency oscillator 26 can be used, at the same time, to control the cut-off frequency $\omega_b$ of a low-pass filter which limits the bandwidth of the input signal such that constantly $\omega_b \approx 2\omega_r$; a suitable filter is manufactured by Aritech Co. of Brighton, Mass.

The phase-sensitive detector may be replaced by an analog multiplier which multiplies input signal and reference voltage. In a truly linear multiplier, sum and difference frequencies are generated only and a dc component occurs exclusively when the reference frequency is contained in the input signal. Here, no response to odd harmonics occurs. A suitable multiplier is manufactured by Motorola Semiconductor Products of Phoenix, Ariz.

Figure 9:
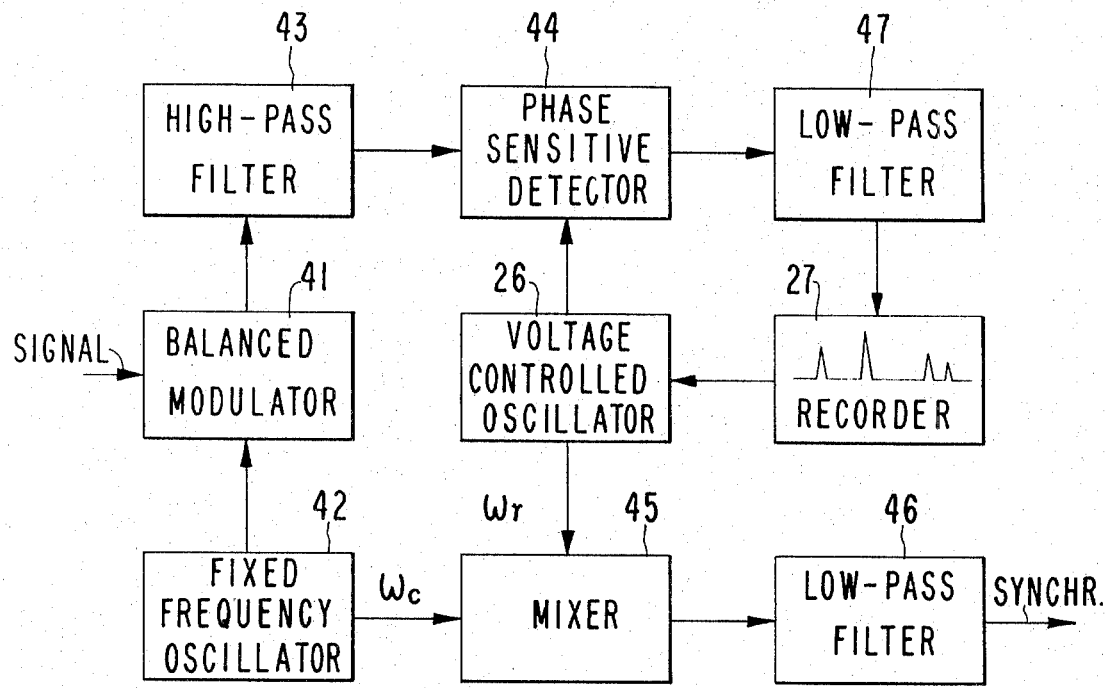
FIG. 9 is a block diagram of one form of analog Fourier analyzer employing frequency shifting to permit suppression of the odd harmonics of the reference in the system of FIG. 7.

In the frequency shifting method shown in FIG. 9, the signal to be analyzed is amplitude-modulated by modulator 41 onto a sufficiently high carrier frequency $\omega_c$ (e.g. 20 – 100 kHz) from oscillator 42 and, after filtering by high pass filter 43, is phase-detected in phase detector 44 using a reference frequency $\Omega_r = \omega_c + \omega$ generated again by a voltage-controlled oscillator 26 driven by the xy-recorder 27. In this case, the exciting pulse sequence is synchronized to the difference frequency $\omega = \omega_r - \omega_c$ which may be obtained by mixing $\omega_r$ and $\omega_c$ in mixer 45 followed by low-pass filtering 46. By frequency shifting, it is possible to reduce the relative frequency variation of $\omega_r$ such that the odd harmonics of $\omega_r$ can easily be eliminated by means of a fixed filter 47.

The latter two methods depend on the linearity of either a multiplier or a modulator which practically is of the order of 9.2 − 1 percent; the analog multiplier method is more easily realized and is the most attractive one.

The described Fourier analyzer is applicable not only to difference frequency spectroscopy but can be utilized as well for the Fourier analysis of free induction decays in conventional Fourier spectroscopy, in the measurement of relaxation times by Fourier techniques and for the determination of J-spectra.

To Fourier-analyze the sum of free induction decays stored in a signal averaging device, the signal averager is maintained to continuously output its content at a high rate through a digital-to-analog converter. This signal is applied to the input of the Fourier analyzer. For phase-sensitive detection, it is necessary to initiate each output sequence synchronized to the reference frequency of the Fourier analyzer.

As a comparison with continuous wave spectroscopy, the normalized signal-to-noise ratios for difference frequency spctroscopy (A) and for cw spectroscopy (B) are plotted in FIG. 10 versus $T_2/T_2^*$, the ratio of observed to natural line width. The sensitivity is normalized by the sensitivity of continuous wave spectroscopy for $T_2^* = T_2$. The sensitivity of difference frequency spectoscopy is independent of transverse relaxation or field inhomogeneity. This is caused by the compensating effects of increasing line width and decreasing free induction decay signal amplitude. In the case of Fourier spectroscopy with multichannel Fourier analysis, this compensating effect is missing and the sensitivity decreases with increasing line width. For cw spectroscopy, the sensitivity also decreases for increasing inhomogenous line width but is independent of the homogeneous line width.

For practical situations, both the cw and difference frequency methods will produce similar sensitivities, but for strong inhomogenous broadening, difference frequency spectroscopy may give a better sensitivity. On the other hand, in cw spectroscopy fast passage experiments may also produce a considerable improvement of the sensitivity but at the expense of considerable line broadening. Like any Fourier technique, difference frequency spectroscopy has the advantage of producing neigher saturation broadening nor sweep broadening.

Figure 11:
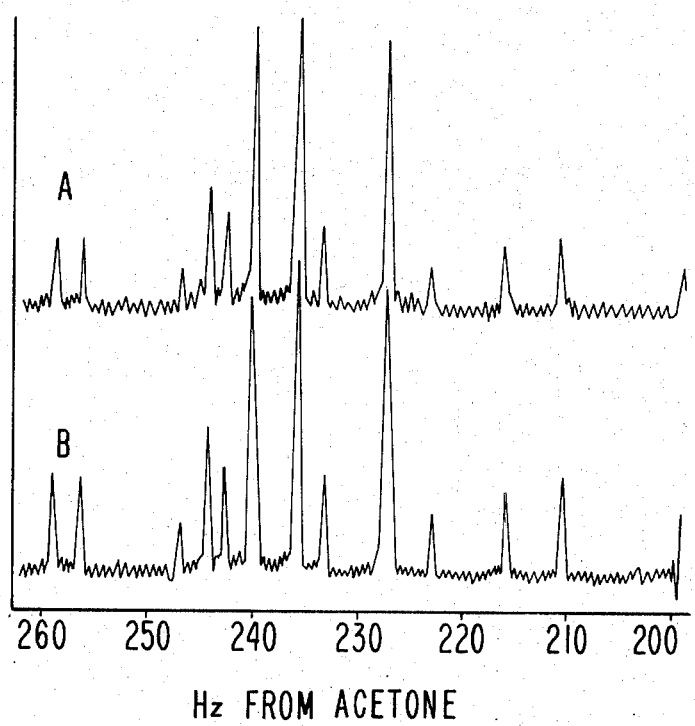
FIG. 11 shows a comparison between the sensitivity of a continuous wave spectrometer as compared with a difference frequency spectrometer of the type shown in FIG. 7.

A comparison of the sensitivity of continuous wave spectroscopy and of difference frequency spectroscopy is given in FIG. 11. Two traces of the 60 MHz proton resonance spectrum of 3 vol% acrylonitrile and 10 vol% acetone as reference in carbon tetrachloride are given for difference frequency spectroscopy (A) and continuous wave spectroscopy (B). Both experiments were performed on the same instrument with the same inherent sensitivity. The scanning time was 5,000 seconds in both cases and the low-pass filter had a cut-off frequency of 0.1 Hz. The signal-to-noise ratios measured at the largest signal peak are for difference frequency spectroscopy $v_s/v_{rms} = 5v_x/v_{ptp} = 90$ and for cw spectroscopy 94.

The sensitivities measured at the strongest signal peak are identical within experimental error. On the other hand, it is obvious that in the difference frequency spectrum the weaker lines appear to be weaker than in the cw spectrum. The saturation behavior of coupled spin systems appears to be different in the two experiments.

Difference frequency spectroscopy provides a simple measuring technique insensitive to magnetic field variations and with sensitivity and resolution at least equivalent to continuous wave spectroscopy. A certain disadvantage of difference frequency spectroscopy of the type shown in FIG. 7 is the slow scanning speed caused by the fact that during one free induction decay one single point of the spectrum can be recorded only. But in contrast to conventional Fourier spectroscopy with digital storage of the data, it is easily possible to record arbitrarily narrow portions of a wide spectrum with high resolution and accuracy.

It should be noted that the above factors relating to difference frequency spectroscopy, except for those regarding dependence on field stability, apply as well to Fourier spectroscopy with field-frequency lock but employing a single channel Fourier analyzer instead of a computer for the Fourier transformation of the free induction decay signals.

What is claimed is:

1. An impulse nuclear magnetic resonance spectrometer comprising means for applying a plurality of pulses of driving radio frequency magnetic field simultaneously to the sample under analysis and to a reference substance in a polarizing magnetic field, said reference subtance having a single strong resonance line separated from the sample resonance lines, to produce simultaneous free induction decay signals from the sample and the reference at their respective radio frequency resonance frequencies to produce a plurality of successive composite decay signals therefrom, means for sensing the successive composite radio frequency decay signals from said sample and reference substance, means coupled to said sensing means for demodulating the separated sample and reference resonance lines of said sensed successive composite signals, said means for demodulating includes means for weighting said sample free induction decay signal by its local signal-to-noise ratio for optimum signal-to-noise ratio, means coupled to said demodulating means for extracting the composite signal comprising the difference frequencies between the sample and reference resonances, means for Fourier transforming said composite signal to obtain a difference frequency spectrum, and means for recording said difference frequency spectrum.

2. An impulse nuclear magnetic resonance spectrometer comprising means for applying a plurality of pulses of driving radio frequency magnetic field simultaneously to the sample under analysis and to a reference substance in a polarizing magnetic field, said reference substance having a single strong resonance line separated from the sample resonance lines, to produce simultaneous free induction decay signals from the different resonant bodies within the sample and the reference at their respective radio frequency resonance frequencies to produce a plurality of successive composite decay signals therefrom, means for sensing the successive composite radio frequency decay signals from said sample and reference substance, means coupled to said sensing means for demodulating the separated sample and reference resonance lines of said sensed successive composite signals, said means for demodulating including means for weighting said sample free induction decay signal by its local signal-to-noise ratio for optimum signal-to-noise ratio, a low-pass filter means coupled to said demodulating means for passing all frequencies in the composite signal up to and including the difference frequencies between the sample and reference resonances, analog-to-digital converting means coupled to said low-pass filter for sampling said passed composite signal, means coupled to said converter for forming a time-averaged signal from the successive decay signals and for subtracting the reference substance response from said time-averaged signal to form a corrected difference frequency response, means for Fourier transforming said corrected difference frequency response, and means for recording said transformed response.

3. An impulse type nuclear magnetic resonance spectrometer comprising transmitter means for applying a plurality of pulses of driving radio frequency magnetic field simultaneously to the sample under analysis and to a reference substance in a polarizing magnetic field, said reference substance having a single strong resonance line separated from the resonance lines of the sample, to produce simultaneous free induction decay signals from the sample and the reference at their respective radio frequency resonance frequencies and thus produce a plurality of successive composite decay signals therefrom, receiver means for sensing the successive composite radio frequency decay signals from said sample and reference substance, means coupled to said sensing means for demodulating the separated sample and reference resonance lines of said sensed successive composite signals, said means for demodulating including means for weighting said sample free induction decay by its local signal-to-noise ratio for optimum signal-to-noise ratio;

a low-pass filter means coupled to said demodulating means for extracting from the composite signal all frequencies up to and including the difference frequencies between the sample and reference resonances to form a difference signal, means comprising an analog Fourier analyzer coupled to said extracting means for providing a difference frequency spectrum of said composite difference signal, said analog analyzer being synchronized in phase with said pulses of driving radio frequency magnetic field, a reference frequency, a sequence generator, said sequence generator being responsive to said reference frequency, said sequence generator providing first and second pulses, said first pulses for gating on said transmitter and gating said receiver off and for gating off said transmitter and said receiver on, and means for recording said spectrum.

4. The spectrometer of claim 3 including a gated integrator and a hold circuit wherein said second pulse of said sequence generator is coupled to said gated integrator to cause the integrator to transfer the stored value of signal to a hold circuit.

5. The method of producing a magnetic resonance spectrum from a sample under analysis comprising the steps of applying a plurality of pulses of driving radio frequency magnetic field simultaneously to the sample under analysis and to a reference substance in a polarizing magnetic field, said reference substance having a single strong resonance line separated from the resonance lines of the sample, to produce simultaneous magnetic resonance from the sample and the reference at their respective radio frequency resonance frequencies to produce a plurality of successive composite decay signals therefrom, sensing the successive composite radio frequency decay signals from said sample and reference substance, demodulating the separated sample and reference resonance lines of said sensed successive composite signals, and discarding from said demodulated signal all the frequencies lower than the difference frequencies between the sample and reference resonances, and passing said difference frequency components, Fourier transforming said passed difference frequency components of said composite signal to obtain a difference frequency spectrum, and recording said difference frequency spectrum.

6. The method of producing a magnetic resonance spectrum from a sample under analysis comprising the steps of applying a plurality of pulses of driving radio frequency magnetic field simultaneously to the sample under analysis and to a reference substance in a polarizing magnetic field, said reference substance having a single strong resonance line separated from the sample resonance lines, to produce simultaneous magnetic resonance from the different resonant bodies within the sample and the reference at their respective radio frequency resonance frequencies to produce a plurality of successive composite decay signals therefrom, sensing the successive composite radio frequency decay signals from said sample and reference substance, demodulating the separated sample and reference resonance lines of said sensed successive composite signals in a non-linear detector, extracting from the demodulated signal with a low-pass filter, the composite signal comprising all frequencies up to and including the difference frequencies between the sample and reference resonances, sampling said extracted composite signal with an analog-to-digital converter, time-averaging the successive sampled signals, and subtracting from said time-averaged successive sampled signals the relaxation response of the reference substance to form a remaining signal, Fourier transforming the remaining signal response, and recording said transformed remaining signal response.

7. The method of producing a magnetic resonance spectrum from a sample under analysis comprising the steps of applying a plurality of pulses of driving radio frequency magnetic field simultaneously to the sample under analysis and to a reference substance in a polarizing magnetic field, said reference substance having a single strong resonance line separated from the resonance lines of the sample, to produce simultaneous free induction decay signals from the sample and the reference at their respective radio frequency resonance frequencies and thus produce a plurality of successive composite decay signals therefrom, sensing the successive composite radio frequency decay signals from said sample and reference substance, demodulating the separated sample and reference resonance lines of said sensed successive composite signals including weighting said sample free induction decay signal by its local signal-to-noise ratio for optimum signal-to-noise ratio, extracting from the demodulated signal the composite signal comprising the difference frequencies between the sample and reference resonances, providing an analog Fourier analysis of said composite signal of difference frequencies to produce a difference frequency spectrum of said composite signal, and means for recording said spectrum.

8. An impulse nuclear magnetic resonance spectrometer comprising means for applying a plurality of pulses of driving radio frequency magnetic field simultaneously to the sample under analysis and to a reference substance in a polarizing magnetic field, said reference substance having a single strong resonance line separated from the sample resonance lines, to produce simultaneous free induction decay signals from the sample and the reference at their respective radio frequency resonance frequencies resulting in a plurality of successive composite decay signals therefrom, means for sensing the successive composite radio frequency decay signals from said sample and reference substance, means coupled to said sensing means for demodulating the separated sample and reference resonance lines of said sensed successive composite signals, said means for demodulating includes means for weighting said free induction decay signal by its local signal-to-noise ratio for optimum signal-to-noise ratio, means coupled to said demodulating means for discarding from the composite signal substantially all frequencies lower than the difference frequencies between the sample and reference resonances to remove the reference response and to form a remaining composite signal, means for Fourier transforming said remaining composite signal to obtain a difference frequency spectrum, and means for recording said difference frequency spectrum.

* * * * *